US011170432B2

(12) United States Patent
Saad

(10) Patent No.: US 11,170,432 B2
(45) Date of Patent: Nov. 9, 2021

(54) RECOMMENDER SYSTEM BASED ON TRENDSETTER INFERENCE

(71) Applicant: Adobe Inc., San Jose, CA (US)

(72) Inventor: Michele Saad, Austin, TX (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/835,986

(22) Filed: Mar. 31, 2020

(65) Prior Publication Data

US 2021/0304283 A1 Sep. 30, 2021

(51) Int. Cl.
G06Q 30/06 (2012.01)
G06N 5/04 (2006.01)

(52) U.S. Cl.
CPC .......... G06Q 30/0631 (2013.01); G06N 5/04 (2013.01)

(58) Field of Classification Search
CPC ................................................ G06Q 30/0631
USPC ...................................................... 705/26.7
See application file for complete search history.

(56) References Cited

U.S. PATENT DOCUMENTS

| 2011/0320715 | A1* | 12/2011 | Ickman | G06Q 30/02 |
| | | | | 711/118 |
| 2013/0290339 | A1* | 10/2013 | LuVogt | G06Q 10/10 |
| | | | | 707/740 |
| 2013/0290905 | A1* | 10/2013 | LuVogt | G06N 3/006 |
| | | | | 715/835 |
| 2016/0274744 | A1* | 9/2016 | Neumann | H04N 21/47202 |

\* cited by examiner

*Primary Examiner* — Alexis M Casey
(74) *Attorney, Agent, or Firm* — FIG. 1 Patents

(57) ABSTRACT

A trend setting score that identifies a degree of trend setting exhibited by a user is generated for each of multiple users. This degree of trend setting exhibited by the user is an indication of how well the user identifies trends for items (e.g., consumes items) prior to the items becoming popular. The item consumption of users with high trend setting scores is then used to identify items that are expected to become popular after a lag in time. For a given user, another user with a high trend setting score (also referred to as a trendsetter) and having a high affinity with (e.g., similar item consumption behavior or characteristics) the given user is identified. Recommendations are provided to the given user based on items consumed by the trendsetter prior to the items becoming popular.

20 Claims, 6 Drawing Sheets

RECOMMENDER SYSTEM BASED ON TRENDSETTER INFERENCE

BACKGROUND

As computing technology has advanced so too have the uses for computing devices. One such use is the consumption of items by users, such as purchasing physical products, viewing digital content, listening to digital content, and so forth. Different systems attempt to identify content to recommend to users in different manners.

One type of recommendation system is a collaborative filtering system. Conventional collaborative filtering systems recommend items to users based on what the system learns from other individuals with similar behavior patterns. For a given user, the system learns the behavior patterns of the user, identifies other users with similar behavior patterns, and recommends items to the given user that the users with similar behavior patterns have consumed.

Another type of recommendation system is a content-based system. Conventional content-based recommendation systems recommend items to users based on items previously consumed by the user. For a given user, the system learns the items the user has consumed in the past and recommends other items that are similar to those the user has consumed.

These conventional solutions, however, generate recommendations based only on the items consumed by the user or items consumed by the general mass of other users with similar behavior patterns. This results in recommendations that are limited in value because they're limited to only the items consumed by the user or include items already consumed by the general mass of users with similar behavior patterns as the user rather than being recommendations that are ahead of the curve (e.g., prior to the general mass of users having consumed the items). This can leave users dissatisfied with the recommendations they receive, and recommendation providers dissatisfied with their systems' abilities to generate valuable recommendations for the users.

SUMMARY

To mitigate the drawbacks of conventional solutions for generating recommendations, a recommender system based on trendsetter inference is described. For each of multiple users, a trend setting score identifying a degree of trend setting exhibited by the user is generated. For the first user, a second user of the multiple users having a high trend setting score and with which the first user has a high affinity is determined. A first item that is not currently popular but has been consumed by the second user is identified, and a recommendation for the first item is caused to be delivered to the first user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
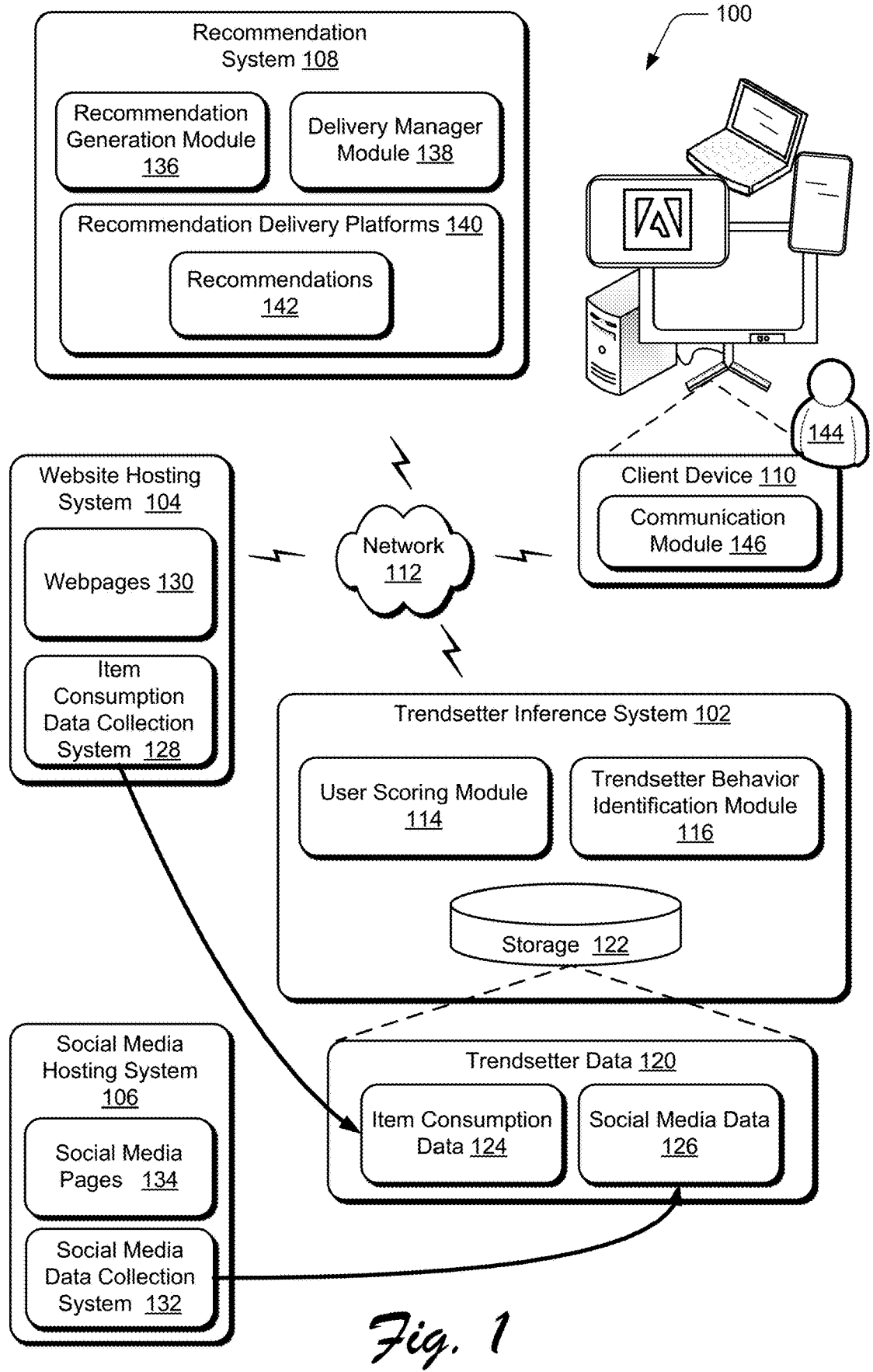
FIG. 1 is an illustration of a digital medium environment in an example implementation that is operable to employ the recommender system based on trendsetter inference described herein.

Techniques for recommender systems based on trendsetter inference are discussed herein. Generally, the techniques discussed herein generate a trend setting score for each of multiple users, the trend setting score for a user identifying a degree of trend setting exhibited by the user. This degree of trend setting exhibited by the user is an indication of how well the user identifies trends for items prior to the items becoming popular (e.g., whether the user is ahead of the curve in identifying items that will become popular). For example, the degree of trend setting exhibited by the user can be an indication of how frequently the user buys products that become popular after a lag in time.

The item consumption of users with high trend setting scores is then used to identify items that are expected to become popular after a lag in time. For a given user, another user with a high trend setting score (also referred to as a trendsetter) and having a high affinity with (e.g., similar item consumption behavior or characteristics as) the given user is identified. Recommendations are provided to the given user based on items consumed by the trendsetter prior to the items becoming popular. Thus, in contrast to systems that generate recommendations based only on the items consumed by the general mass of other users with similar behavior patterns, the techniques discussed herein allow recommendations to be generated based on the behavior of other users that have exhibited a behavior of consuming items prior to the items becoming popular (e.g., based on the behavior of only those other users, not the behavior of the general mass of other users).

More specifically, a trendsetter inference system receives one or both of item consumption data and social media data. The item consumption data refers to various data regarding items consumed by users via a website hosting system and the users that consume the items. The social media data refers to various data regarding social media characteristics of users, such as a number of followers a user has.

The trendsetter inference system generates, for each of multiple users, a trend setting score. The trend setting score of a given user identifies a degree of trend setting exhibited by the user. In one or more implementations each trend setting score is a numeric value where larger values indicate better scores than smaller values. Better scores represent a higher degree of trend setting exhibited by the user than lesser scores.

The trend setting score for a given user is generated based on at least one factor from the group of factors including: the frequency with which the given user consumes items that gain popularity after a lag in time, the number of other users that exhibit similar trends after the lag in time, social media score, and trend setting scores of the other users exhibiting similar trends after the lag in time.

The frequency with which the given user consumes items that gain popularity after a lag in time factor refers to how often or how frequently the user consumes an item at a time that the item is not considered popular but that after a lag in time becomes popular. An item being popular refers to an item that has been consumed by a significant (e.g., large) number of users. What constitutes a significant number of users can be determined in various manners as discussed below, such as by having the item consumption match one or more patterns over a duration of time, having the item consumption exceed a threshold amount, and so forth.

The lag in time (also referred to as time lag) refers to an amount of time that elapses between the user consuming the item and the item subsequently becoming popular. Different items or different groups (e.g., classes) of items can have different time lags. For example, the lag in time for one group of physical items (such as clothing) may be a number of months whereas the lag in time for another group of physical items (such as books) may be a number of weeks (e.g., less than one month). By way of another example the lag in time of digital content may be a number of hours or day. By way of another example, the lag in time of different groups of digital content may vary, such as a lag in time of a number of days for movie digital content but a lag in time of a number of hours (e.g., less than a day) for music digital content.

Whether the user consumes an item at a time that the item is not considered popular but that after a lag in time becomes popular can be determined in a variety of different manners. Typically, item consumption data for each of multiple time periods included in a duration of time is analyzed. For example, the time period can be hours and the duration of time multiple (e.g., 15) days. By way of another example, the time period can be days and the duration of time multiple (e.g., 90, 365) days. The time period and the duration of time can vary by item or group of items.

Any of a variety of public or proprietary pattern matching techniques, optionally including temporal outlier detection, can be used to analyze the item consumption data. These pattern matching techniques analyze the item consumption data over the duration of time to identify patterns of low item consumption followed by a lag in time then high item consumption. The lag in time can be specified (e.g., by a user or administrator of the trendsetter inference system) or can be automatically learned by the pattern matching technique.

Additionally or alternatively, whether a user consumes an item at a time that the item is not considered popular but that after a lag in time becomes popular can be determined using a machine learning system. The machine learning system is trained to identify, based on the item consumption data, situations in which a user consumes an item at a time that the item is not considered popular but that after a lag in time becomes popular in various different manners. In one or more implementations, the machine learning system is trained by providing training data including item consumption data for a duration of time along with a tag indicating whether the item consumption data indicates an item that became popular a lag in time after a user consumed the item. The machine learning system determines whether the item consumption data indicates an item that became popular a lag in time after a user consumed the item, compares the determination to the tag, and adjusts various weights in the machine learning system to minimize a loss function.

For a given user the trendsetter inference system has a number of instances of the user consuming items over the duration of time. The frequency F of the user consuming an item at a time that the item is not considered popular but that after a lag in time becomes popular can be determined as:

$$F = \frac{I_y}{I_y + I_n}$$

where $I_y$ refers to the number of items consumed by the user during the duration of time at a time that the item is not considered popular but that after a lag in time becomes popular, and $I_n$ refers to the number of items consumed by the user during the duration of time not at a time that the item is not considered popular but that after a lag in time becomes popular.

The number of other users that exhibit similar trends after the lag in time factor refers to the number of other users that consumed the item after the item became popular (including consuming the item while the item was popular). The number of users that exhibit similar trends after the item became popular can be identified in a variety of different manners. In one or more implementations, within the duration of time, a time period having the highest amount of consumption is selected. The number of users that consumed items in that selected time period is used as the number of other users that exhibit similar trends after the lag in time.

The social media score factor refers to the activity of the user on one or more social media pages or accounts, and is received as social media data. Various different activity of the user on social media can be analyzed to generate the social media score. In one or more implementations, the social media data includes data indicating a number of followers of the user. A follower of the user refers to another user that has signed up or agreed to receive communications from the user, such as by following the user's account, by becoming a friend of the user, and so forth. Higher social media scores are assigned to users that have more followers than users that have less followers. E.g., the social media score can be the number of followers the user has, a value assigned based on the number of followers (e.g., a value of 10 if the number of followers of the user is in the top 10% of all users, a value of 9 if the number of followers of the user is in the top 20% of all users, and so forth), etc.

Additionally or alternatively, the social media data includes data indicating how active the user is on social media. This activity can be measured in various manners, such as a number of communications or updates made (e.g., messages, posts, tweets, etc.) during the duration of time, also referred to as the frequency of communications or updates made.

For a given user, the trend setting scores of the other users exhibiting similar trends after the lag in time factor refers to the trend setting scores of other users that consumed the item, within the duration of time and after the lag in time, that was consumed by the given user. The trend setting scores of these other users exhibiting similar trends after the lag in time can be combined in various manners, such as by averaging the trend setting scores of these other users, taking the mean of the trend setting scores of these other users, and so forth.

In one or more implementations, the trend setting score for a user is determined by combining the frequency with which the given user consumes items that gain popularity after a lag in time, the number of other users that exhibit similar trends after the lag in time, the social media score, and the trend setting scores of the other users exhibiting similar trends after the lag in time factors. These factors can be combined in various manners, such as a weighted sum of the factors.

Given the trend setting scores, the trendsetter inference system also identifies, for a given user, one or more other users with high trend setting scores that the given user has a high affinity with. The given user having a high affinity with another user refers to the given user having similar characteristics or behaviors as the other user. Accordingly, by identifying a user with a high trend setting score (also referred to as a trendsetter) that has a high affinity with the given user, the behavior of the trendsetter (e.g., items consumed recently by the trendsetter) can be used to generate recommendations for the given user of items that are likely to become popular in the future because the trendsetter has demonstrated a tendency for consuming items ahead of the trend (before the items become popular).

The trendsetter inference system also monitors the item consumption data and identifies, for a given user, when another user that is identified as having high affinity with the given user and a high trend setting score consumes an item. Given the high trend setting score and the affinity with the given user, a recommendation for the item consumed by the other user can be provided to the given user.

The techniques discussed herein improve the recommendations for items that are provided to users by providing recommendations of items to users that are likely to become popular in the future due to the recommendations being based on item consumption of users that have experienced a pattern of consuming items prior to the items becoming popular (e.g., trendsetters). These recommendations are further improved due to the recommendations that are provided to a given user are based on item consumption of a trendsetter with which the given user has a high affinity—these techniques are not just recommending items based on all of the trendsetters' behaviors, but on the behavior of a trendsetter with which the given user has high affinity (e.g., similar item consumption behaviors or characteristics).

Furthermore, the techniques discussed herein allow identification, before they become popular, of items that will become popular. These techniques arrive at recommendations that are ahead of the curve (e.g., earlier than conventional techniques). This improves item management systems, allowing suppliers to have these items available before they become popular. For example, suppliers can provide better inventory management by having a stock on hand of the items that are predicted to become popular but less stock on hand of the items that are not predicted to become popular.

Term Descriptions

These term descriptions are provided for purposes of example only and are not intended to be construed as limiting on the scope of the claims.

The term "user" refers to an individual person, a collection of people (e.g., sharing an account or identifier), or a non-human entity that consumes items (e.g., a bot or other program).

The term "item" refers to a physical product, digital content, or a service.

The term "item consumption", or reference to an item being consumed, refers to using the item. Different types of items can be consumed in different manners. For example: physical products can be purchased; digital content can be purchased, viewed, listened to, read, and so forth; services can be purchased; and so forth.

The term "trend setting score" of a user refers to a degree of trend setting exhibited by the user. This degree of trend setting is indicated by, for example, a pattern of the user consuming an item that is not popular at the time of consumption but becomes popular after a lag in time. The degree of trend setting can be further indicated by other characteristics or behavior of the user that indicate the influence of the user, such as the user's social media presence.

The term "trendsetter" refers to a user having a high trend setting score. What constitutes a high trend setting score can be determined in various manners, such as the trend setting scores of all users (e.g., the top 10% of trend setting scores are high trend setting scores), the trend setting scores of a sub-group of users (e.g., the highest trend setting score of a user in the sub-group, which can be a group of users with which a particular user has a high affinity), and so forth.

The term "duration of time" refers to a range of time during which data can be analyzed in order to determine the trend setting score and to generate recommendations. This range of time can vary, such as multiple hours, multiple days, multiple weeks, multiple months, and so forth. This duration of time can be, but need not be, consecutive.

The term "time period" refers to a sub-range of time within the duration of time. This sub-range of time can vary based on the duration of time, such as being individual hours, individual days, and so forth. These time periods can be consecutive within the duration of time and together cover the entire duration of time, or alternatively can cover less than the entire duration of time.

The term "popular" refers to an item that has been consumed by a significant number of users (e.g., a large number of users). What constitutes a significant number of users can be determined in various manners, such as by having the item consumption match one or more patterns over a duration of time, having the item consumption exceed a threshold amount, and so forth.

The term "high affinity" refers to the similarity of one user to another. A first user has high affinity with a second user if the second user has similar item consumption characteristics or behaviors as the first user.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the recommender system based on trendsetter inference described herein. The illustrated environment 100 includes a trendsetter inference system 102, a website hosting system 104, a social media hosting system 106, a recommendation system 108, and a client device 110 that are communicatively coupled, one to another, via a network 112.

Computing devices that are usable to implement the trendsetter inference system 102, the website hosting system 104, the recommendation system 108, and the client device 110 may be configured in a variety of ways. A computing device, for instance, may be configured as a desktop computer, a laptop computer, a mobile device (e.g., assuming a handheld configuration such as a tablet or mobile phone), a wearable device (e.g., a watch or other jewelry, virtual reality glasses, augmented reality glasses), and so forth. Thus, the computing device may range from full resource devices with substantial memory and processor resources (e.g., personal computers, game consoles) to low resource devices with limited memory and/or processing resources (e.g., mobile devices). Additionally, a computing device may be representative of a plurality of different devices, such as multiple servers utilized by a business to perform operations "over the cloud" as further described in relation to FIG. 6.

The trendsetter inference system 102 includes a user scoring module 114 and a trendsetter behavior identification module 116. The user scoring module 114 is representative of functionality to generate a trend setting score for each of multiple users. The trendsetter behavior identification module 116 is representative of functionality to identify the behavior of trendsetters (users with high trend setting scores), such as items consumed by trendsetters. The user scoring module 114 and the trendsetter behavior identification module 116 use various different trendsetter data 120 in a storage 122. The storage 122 can be any one or more of a variety of different types of storage, such as random access memory (RAM), Flash memory, solid state drive, magnetic disk drive, and so forth. The trendsetter data 120 includes item consumption data 124 and social media data 126.

To identify such trend setting scores, the user scoring module 114 uses the item consumption data 124 and social media data 126. To identify future trending items (items that are predicted to become popular in the future), the trendsetter behavior identification module 116 uses item consumption data 124. The item consumption data 124 generally represents various data regarding items consumed and the users that consume the items. Consuming an item can include, for example, purchasing a physical product, purchasing a service, viewing or listening to digital content, and so forth. The item consumption data 124 is collected by an item consumption data collection system 128 on the website hosting system 104. The item consumption data collection system 128 monitors and collects data regarding users' browsing behavior on the webpages 130 of the website hosting system 104, including information regarding consumption of items on the webpages 124. This collected data is stored as item consumption data 124. The item consumption data 124 and its use are discussed in more detail below.

The social media data 126 generally represents various data regarding social media characteristics of users. These characteristics can include, for example, a number of followers of a user, a frequency or number of social media posts by a user, and so forth. The social media data 126 is collected by a social media data collection system 132 on the social media hosting system 106. The social media data collection system 132 monitors and collects data regarding users' social media characteristics on social media pages 134 or other social media accounts. This collected data is stored as social media data 126. The social media data 126 and its use are discussed in more detail below.

The recommendation system 108 includes recommendation generation module 136 and a delivery manager module 138 that implements and exposes recommendation delivery platforms 140. The recommendation delivery platforms 140 represent different mediums by which recommendations can be exposed, such as websites, network-accessible applications, content streaming services, television stations, radio stations, and so forth. The recommendation delivery platforms 140 are leveraged by the delivery manager module 138 to deliver recommendations 142 generated by the recommendation generation module 136. Examples of the recommendations 142 include advertisements for items, suggestions of items to purchase or otherwise consume, and so forth.

A user 144 of the client device 110 leverages a communication module 146 to interact with a particular recommendation delivery platform 140 and to consume a recommendation 142. The communication module 146 generally represents functionality for presenting content on the client device 110. Examples of the communication module 146 include a web browser, a network-enabled application (e.g., an email application), a television receiver, and so on, that can obtain content data from the recommendation system 108 via the network 112, and output the recommendation 142 via the client device 110.

According to techniques for a recommender system based on trendsetter inference, the user scoring module 114 uses the item consumption data 124 and the social media data 126 to generate trend setting scores for multiple users. The trendsetter behavior identification module 116 uses these trend setting scores and the item consumption data 124 to identify item consumption by trendsetters prior to the item becoming popular. The trendsetter inference system 102 predicts or infers that the item will become popular due to the trendsetting pattern evidenced by the trendsetter. The indication of the predicted items is provided to the recommendation system 108, which generates recommendations 142 based on these indicated items, and the delivery manager module 138 manages delivery of one or more recommendations 142 to the user 144.

The recommendation system 108 can deliver a recommendation to the user 144 in a variety of different manners. For example, the recommendation delivery platform 140 can send an email to the user 144. By way of another example, when the user 144 accesses the website hosting system 104, the website hosting system 104 can contact the recommendation delivery platform 140 and provide an identifier of the user (e.g., a cookie received from the communication module 146) corresponding to the user 144 to the recommendation system 108, which then returns a recommendation to the website hosting system 104 based on the user 144 as well as the trendsetters and future trending items. The website hosting system 104 can then communicate the recommendation to the client device 110 for display or other presentation to the user 144.

Each user 144 has an identifier that is tracked in the digital media environment 100. This tracking can take various forms, such as a cookie or other identifier provided by the communication module 146 to the website hosting system 104, the social media hosting system 106, the recommendation system 108, and so forth. The item consumption data 124 collected by the website hosting system 104 and the social media data 126 collected by the social media hosting system 106 include this identifier, allowing the trendsetter inference system 102 to know which item consumption data 124 and which social media data 126 corresponds to which user. This tracking allows the recommendation system 108 to deliver recommendations tailored to the individual users. Although a user is tracked it should be noted that the actual identity of that user need not be tracked or known. E.g., the name of the user need not be tracked, whether the user is a human or a bot need not be tracked, whether the user is a collection of individuals (e.g., a corporate entity) need not be known, and so forth.

Trendsetter Inference System Architecture

Figure 2:
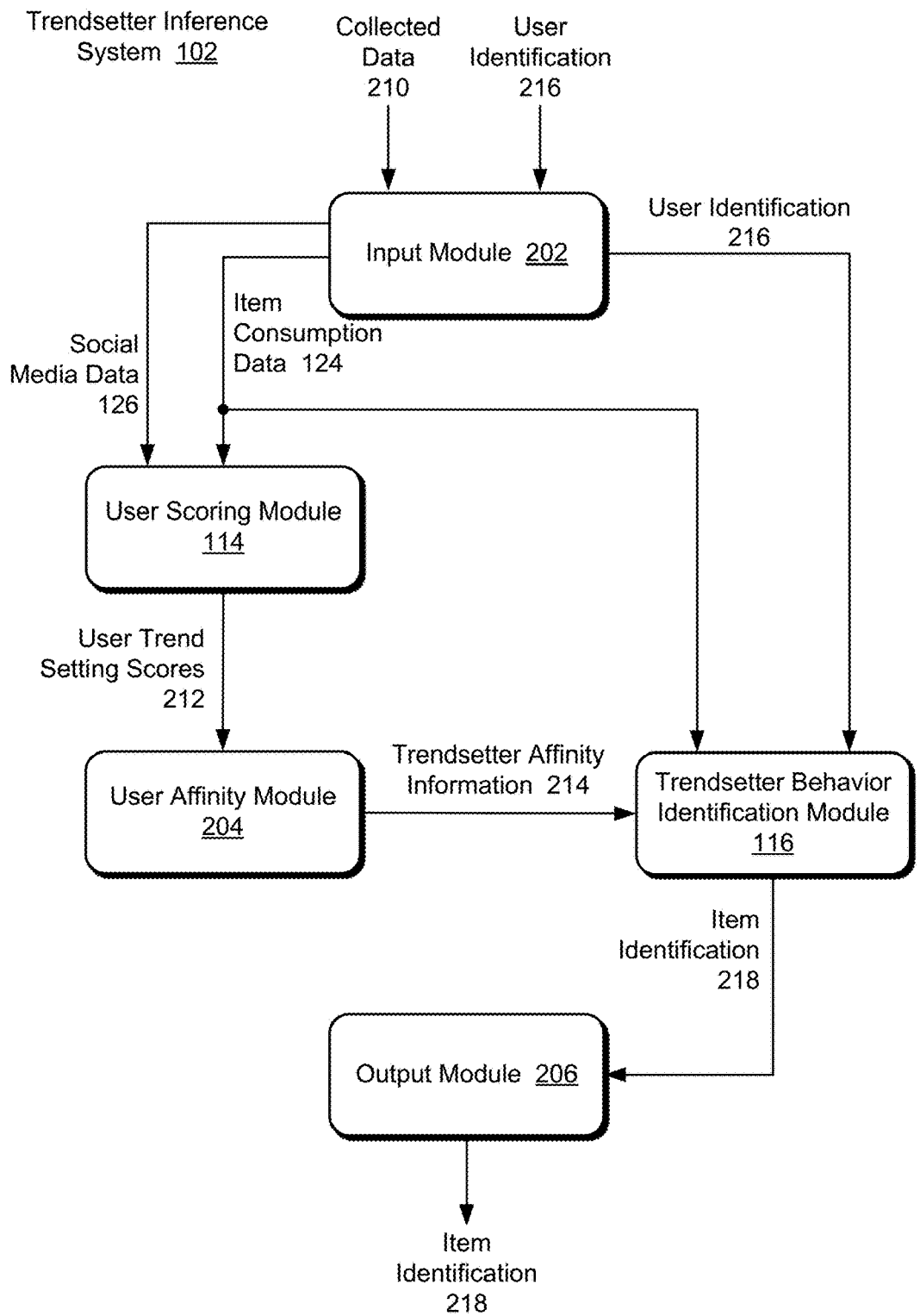
FIG. 2 is an illustration of an example architecture of a trendsetter inference system.

FIG. 2 is an illustration of an example architecture of a trendsetter inference system 102. The trendsetter inference system 102 includes the user scoring module 114 and the trendsetter behavior identification module 116 as discussed above. The trendsetter inference system 102 further includes an input module 202, a user affinity module 204, and an output module 206.

The input module 202 receives collected data 210. The collected data includes one or both of the item consumption data 124 and the social media data 126 of FIG. 1, and is received from, for example, the storage 122 of FIG. 1. The input module 202 provides the item consumption data 124 to the user scoring module 114 and the trendsetter behavior identification module 116.

The user scoring module 114 generates a trend setting score for each of multiple users of the digital medium environment 100 of FIG. 1. Each user has an identifier that is tracked as discussed above. This tracking allows the recommendation system 108 to deliver recommendations tailored to the individual users.

The user scoring module 114 generates, for each user of the digital medium environment 100, a trend setting score 212, which are provided to the time 116. The trend setting score 212 of a given user identifies a degree of trend setting exhibited by the user. In one or more implementations each trend setting score 212 is a numeric value where larger values indicate better scores than smaller values. Better scores represent a higher degree of trend setting exhibited by the user than lesser scores. Additionally or alternatively, the trend setting score can be implemented in other manners, such as a numeric value where smaller values indicate better scores than larger values, using values other than numeric values (e.g., letter grades A through F, other labels such as "very low", "low", "medium", "high", "very high", and "extremely high"), and so forth.

The trend setting score 212 for a given user is generated based on at least one factor from the group of factors including: the frequency with which the given user consumes items that gain popularity after a lag in time, the number of other users that exhibit similar trends after the lag in time, social media score, and trend setting scores of the other users exhibiting similar trends after the lag in time.

The frequency with which the given user consumes items that gain popularity after a lag in time factor refers to how often or how frequently the user consumes an item at a time that the item is not considered popular but that after a lag in time becomes popular.

An item being popular refers to an item that has been consumed by a significant (e.g., large) number of users. What constitutes a significant number of users can be determined in various manners as discussed below, such as by having the item consumption match one or more patterns over a duration of time, having the item consumption exceed a threshold amount, and so forth.

The lag in time (also referred to as time lag) refers to an amount of time that elapses between the user consuming the item and the item subsequently becoming popular. Different items or different groups (e.g., classes) of items can have different time lags. For example, the lag in time for one group of physical items (such as clothing) may be a number of months whereas the lag in time for another group of physical items (such as books) may be a number of weeks (e.g., less than one month). By way of another example the lag in time of digital content may be a number of hours or day. By way of another example, the lag in time of different groups of digital content may vary, such as a lag in time of a number of days for movie digital content but a lag in time of a number of hours (e.g., less than a day) for music digital content.

By taking into account the frequency with which the given user consumes items that gain popularity after a lag in time the trend setting score 212 more accurately identifies a degree of trend setting exhibited by the user because it allows users that consume items that become popular after a lag in time on a regular basis to have higher trend setting scores than users that consume items that become popular after a lag in time only occasionally. Furthermore, by taking into account the lag in time the trend setting score 212 more accurately identifies a degree of trend setting exhibited by the user because it allows users that consume items prior to the items becoming popular to have higher trend setting scores than users that consume items after the items become popular.

Whether the user consumes an item at a time that the item is not considered popular but that after a lag in time becomes popular can be determined in a variety of different manners. Typically, item consumption data for each of multiple time periods included in a duration of time is analyzed. For example, the time period can be hours and the duration of time multiple (e.g., 15) days. By way of another example, the time period can be days and the duration of time multiple (e.g., 90, 365) days. The time period and the duration of time can vary by item or group of items.

Any of a variety of public or proprietary pattern matching techniques, optionally including temporal outlier detection, can be used to analyze the item consumption data. These pattern matching techniques analyze the item consumption data over the duration of time to identify patterns of low item consumption followed by a lag in time then high item consumption. The lag in time can be specified (e.g., by a user or administrator of the trendsetter inference system 102) or can be automatically learned by the pattern matching technique.

Temporal outlier detection identifies situations in which one or more data points (outliers) are outside the expected pattern. For example, in situations in which a pattern matching technique identifies a pattern of low item consumption followed by a lag in time then high item consumption, temporal outlier detection can be used to identify those data points (e.g., number of items consumed) that are outliers (e.g., consumed the items before the lag in time) and, for the users corresponding to those data points, the consumption of the item is considered an instance of the user consuming an item at a time that the item is not considered popular but that after a lag in time becomes popular. Any of a variety of public or proprietary temporal outlier detection techniques can be used with the techniques discussed herein.

Additionally or alternatively, the lag in time (also referred to as time lag) can be determined in other manners. In one or more implementations, a user or administrator of the trendsetter inference system 102 provides input specifying the lag in time for each of one or more items. Additionally or alternatively, an indication of the lag in time for one or more items can be obtained from another device or system.

Additionally or alternatively, when an item becomes popular can be determined in other manners. In one or more implementations, the item consumption data is analyzed over a duration of time including multiple time periods as discussed above. An item is considered popular if one or more rules or criteria indicate that the item is popular. For example, a rule can be that if item consumption in a time period peaked at a level (optionally for some duration of multiple time periods) that is at least a threshold amount greater (e.g., 4×) than the item consumption in the time period that the user consumed the item (or the average item consumption for some grouping of prior time periods), then the item is determined to be popular.

Given such a determined lag in time and an indication of whether an item becomes popular, if an item becomes popular and satisfies the lag in time condition, then the consumption of the item is counted as an instance of the user consuming an item at a time that the item is not considered popular but that after a lag in time becomes popular. However, if the item does not become popular or does not satisfy the lag in time condition, then the consumption of the item is not counted as an instance of the user consuming an item at a time that the item is not considered popular but that after a lag in time becomes popular.

Additionally or alternatively, whether a user consumes an item at a time that the item is not considered popular but that after a lag in time becomes popular can be determined using a machine learning system. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

For example, such a machine learning system can be one or more convolutional neural networks (CNNs). A CNN is formed from layers of nodes (i.e., neurons) and can include various layers such as an input layer, an output layer, and one or more hidden layers such as convolutional layers, pooling layers, activation layers, fully connected layers, normalization layers, and so forth.

The machine learning system is trained to identify, based on the item consumption data, situations in which a user consumes an item at a time that the item is not considered popular but that after a lag in time becomes popular in various different manners. In one or more implementations, the machine learning system is trained by providing training data including item consumption data for a duration of time along with a tag indicating whether the item consumption data indicates an item that became popular a lag in time after a user consumed the item. The machine learning system determines whether the item consumption data indicates an item that became popular a lag in time after a user consumed the item, compares the determination to the tag, and adjusts various weights in the machine learning system to minimize a loss function.

Regardless of the manner in which whether a user consumes an item at a time that the item is not considered popular but that after a lag in time becomes popular is determined, for a given user the user scoring module 114 has a number of instances of the user consuming items over the duration of time. The frequency F of the user consuming an item at a time that the item is not considered popular but that after a lag in time becomes popular can be determined as:

$$F = \frac{I_y}{I_y + I_n}$$

where $I_y$ refers to the number of items consumed by the user during the duration of time at a time that the item is not considered popular but that after a lag in time becomes popular, and $I_n$ refers to the number of items consumed by the user during the duration of time not at a time that the item is not considered popular but that after a lag in time becomes popular. The value $I_y + I_n$ is the total number of items consumed by the user during the duration of time.

The number of other users that exhibit similar trends after the lag in time factor refers to the number of other users that consumed the item after the item became popular (including consuming the item while the item was popular). The number of users that exhibit similar trends after the item became popular can be identified in a variety of different manners. In one or more implementations, within the duration of time, a time period having the highest amount of consumption is selected. The number of users that consumed items in that selected time period is used as the number of other users that exhibit similar trends after the lag in time.

Additionally or alternatively, the number of users that exhibit similar trends after the item became popular can be identified in other manners. For example, the amount of consumption in each of multiple time periods in the duration of time can be determined and combined (e.g., summed), and the combination used as the number of other users that exhibit similar trends after the lag in time. These multiple time periods can be identified in various manners. For example, the multiple time periods can be a threshold number (such as a fixed number (e.g., 5)) or a variable number (e.g., 10% of the number of periods in the duration of time) of time periods having the largest amounts of item consumption.

By taking into account the number of other users that exhibit similar trends after the lag in time the trend setting score 212 more accurately identifies a degree of trend setting exhibited by the user because it allows users that consume items that have become very popular (have larger consumption amounts) to have higher trend setting scores than users that consume items that become less popular (have smaller consumption amounts).

The social media score factor refers to the activity of the user on one or more social media pages or accounts, and is received as social media data 126. Various different activity of the user on social media can be analyzed to generate the social media score. In one or more implementations, the social media data 126 includes data indicating a number of followers of the user. A follower of the user refers to another user that has signed up or agreed to received communications from the user, such as by following the user's account, by becoming a friend of the user, and so forth. Higher social media scores are assigned to users that have more followers than users that have less followers. E.g., the social media score can be the number of followers the user has, a value assigned based on the number of followers the user has (e.g., a value of 10 if the number of followers of the user is in the top 10% of all users, a value of 9 if the number of followers of the user is in the top 20% of all users, and so forth), etc.

Additionally or alternatively, the social media data 126 includes data indicating how active the user is on social media. This activity can be measured in various manners, such as a number of communications or updates made (e.g., messages, posts, tweets, etc.) during the duration of time, also referred to as the frequency of communications or updates made.

Users that are more active on social media are typically more likely to influence additional users because of the greater activity on their social media pages or accounts than users that are less active on social media. Accordingly, by taking into account the social media score of the user the trend setting score 212 more accurately identifies a degree of trend setting exhibited by the user because it allows users that are more active on social media to have higher trend setting scores than users that are less active on social media.

For a given user, the trend setting scores of the other users exhibiting similar trends after the lag in time factor refers to the trend setting scores of other users that consumed the item, within the duration of time and after the lag in time, that was consumed by the given user. The trend setting scores of these other users exhibiting similar trends after the lag in time can be combined in various manners, such as by averaging the trend setting scores of these other users, taking the mean of the trend setting scores of these other users, and so forth.

By taking into account the trend setting scores of the other users exhibiting similar trends after the lag in time the trend setting score 212 more accurately identifies a degree of trend setting exhibited by the user because it allows a given user that consumes an item that is also consumed after the lag in time by other users with high trend setting scores to have a higher trend setting score than if the item was not users that consume items that become popular after a lag in time consumed after the lag in time by other users with high trend setting scores. Those other users that have higher trend setting scores are more likely to influence still other users to consume the item, so the given user has a higher trend setting score.

In one or more implementations, the trend setting score 212 for a user u is determined as $Score_u$ as follows:

$$Score_u = w_1 F + w_2 O + w_3 M + w_4 T$$

where F refers to the frequency with which the given user consumes items that gain popularity after a lag in time, O refers to the number of other users that exhibit similar trends after the lag in time, M refers to the social media score, and T refers to the trend setting scores of the other users exhibiting similar trends after the lag in time, $w_i$ refers to a weight, and i is an integer value ranging from 1 to 4. Each of the values F, O, M, and T is normalized (e.g., to between 0 and 1) so that the values F, O, M, and T have a common scale.

The user scoring module 114 receives one or both of the social media data 126 and the item consumption data 124 and generates the trend setting scores 212 for the users of the digital medium environment 100. The trend setting scores 212 are provided to the user affinity module 204. The user affinity module 204 is representative of functionality to identify, for a given user, one or more other users with high trend setting scores that the given user has a high affinity with. The given user having a high affinity with another user refers to the given user having similar characteristics or behaviors as the other user. Accordingly, by identifying a user with a high trend setting score (also referred to as a trendsetter) that has a high affinity with the given user, the behavior of the trendsetter (e.g., items consumed recently by the trendsetter) can be used to generate recommendations for the given user of items that are likely to become popular in the future because the trendsetter has demonstrated a tendency for consuming items ahead of the trend (before the items become popular).

For each of multiple users (e.g., each user of the digital media environment 100), the user affinity module 204 identifies the similarity between a given user and other ones of the multiple users with high trend setting scores. The users with high trend setting scores can be identified in various manners. For example, a threshold value can be used, with trend setting scores that satisfy (e.g., exceed) the threshold value being high trend setting scores, and trend setting scores that do not satisfy (e.g., do not exceed) the threshold value not being high trend setting scores. This threshold value can be a fixed value (e.g., on a scale of 0 to 1 with 1 being the highest trend setting score, a value of 0.85 or higher) or a variable value (e.g., the top 10% of trend setting scores).

For a given user, the user affinity module 204 identifies one or more other users having high trend setting scores that the given user has high affinity with. These one or more other users are also referred to as trendsetters associated with or assigned to the given user. This affinity can be based on various characteristics or behavior of the users, such as items consumed, the timing of items being consumed (e.g., frequency, hour of day, day of week), items viewed (e.g., looked at or a description read but not purchased, downloaded, or otherwise consumed), the timing of items being viewed (e.g., frequency, hour of day, day of week), and so forth. This affinity can be determined by evaluating characteristics or behavior of the users during the duration of time discussed above or alternatively other (e.g., longer) amounts of time.

These one or more other users can be identified using any of a variety of public or proprietary similarity metrics, public or proprietary similarity techniques, and so forth. For example, various public or proprietary similarity techniques can determine a distance between the given user and each of the other users based on the characteristics or behavior of the given user and the other users. Other users that are similar to (e.g., have a smallest distance to) the given user are users with which the given user has a high affinity.

Additionally or alternatively, users with high trend setting scores can be identified in other manners. For example, for a given user the user affinity module 204 may identify other ones of the multiple users with which the given user has a high affinity. One or more of the multiple users with which the given user has a high affinity and having a highest trend setting score is selected as a user having a highest trend setting score. These one or more other users are also referred to as trendsetters associated with or assigned to the given user. Thus, in this example, the other user that the given user has high affinity with is the user having the highest trend setting score regardless of what that trend setting score is.

Figure 3:
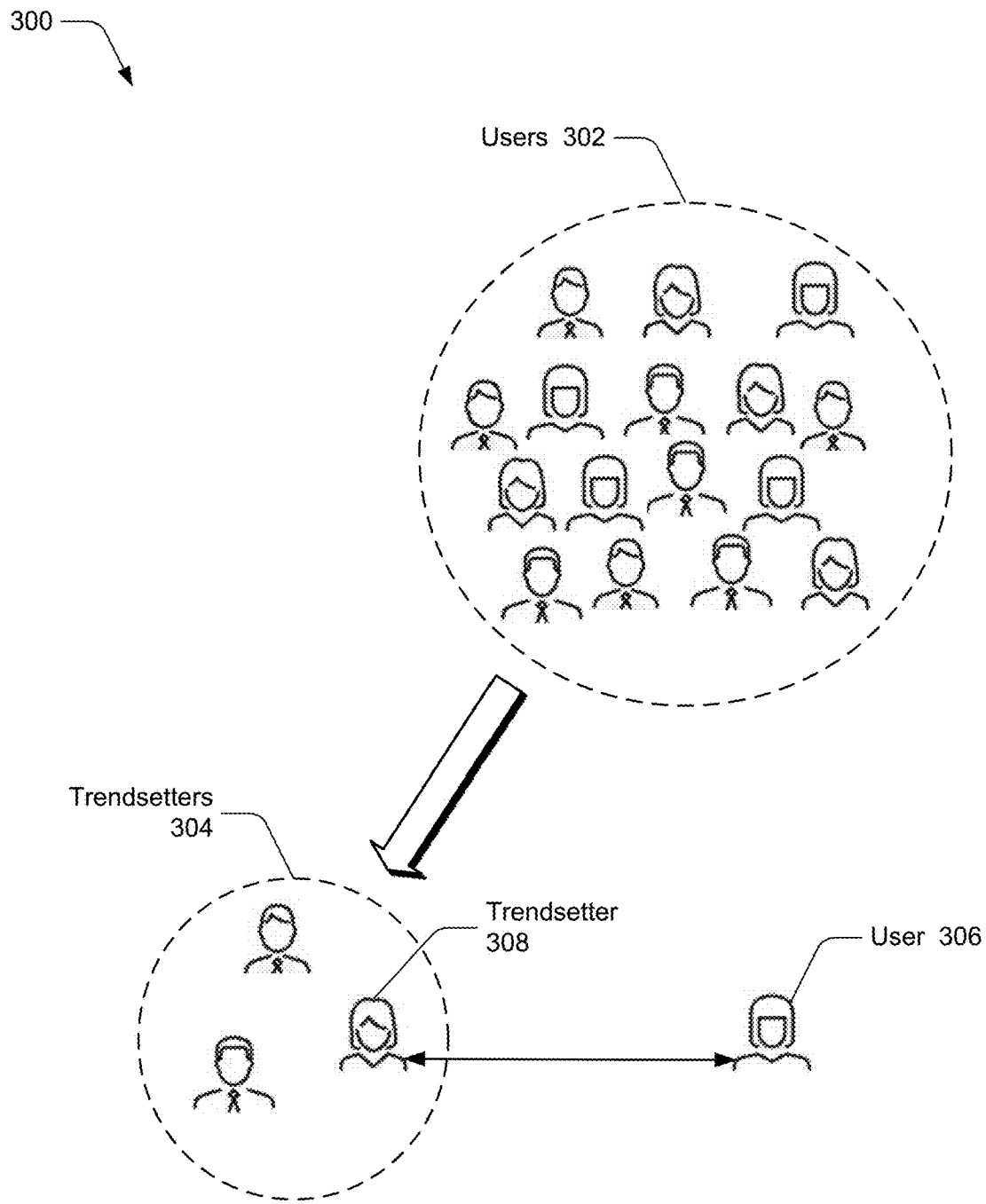
FIG. 3 illustrates an example of a trendsetter with which a given user has a high affinity.

FIG. 3 illustrates an example 300 of a trendsetter with which a given user has a high affinity. Multiple users 302 are illustrated in example 300, each being a user of the digital media environment 100. Multiple trendsetters 304 are identified from the user 302 using any of a variety of different techniques as discussed above. For a given user 306, one or more of the trendsetters 304 with which the given user 306 has a high affinity are identified. In the illustrated example, a single trendsetter 308 is identified as the trendsetter with which the user 306 has a high affinity.

Returning to FIG. 2, the user affinity module 204 provides trendsetter affinity information 214 to the trendsetter behavior identification module 116. The trendsetter affinity information 214 identifies, for each of one or more users of the digital media environment 100, one or more other users with which the user has a high affinity and that has a high trend setting score.

The trendsetter behavior identification module 116 monitors the item consumption data 124 and identifies, for a given user, when another user that is identified as having high affinity with the given user and a high trend setting score consumes an item. This item is, for example, an item that is consumed at a time that the item is not considered popular. Given the high trend setting score and the affinity with the given user, a recommendation for the item consumed by the other user can be provided to the given user.

In one or more implementations, the trendsetter inference system 102 receives a request from the recommendation system 108 of FIG. 1 for one or more item recommendations for a given user. An identifier of the given user is received by the input module 202 as user identification 216. The user identification 216 is provided to the trendsetter behavior identification module 116, which identifies one or more items that a trendsetter associated with the identified user has consumed. These one or more items can be, for example, a particular number (e.g., 3) of items most recently consumed by the trendsetter, a number of items consumed by the trendsetter over a particular amount of time (e.g., in a particular number (e.g., 3) of most recent time periods), and so forth. These items are, for example, items that were consumed by the trendsetter at a time that the items were not considered popular.

The trendsetter behavior identification module 116 provides an identification of the identified one or more items to the output module 206 as item identification 218. The output module 206 then provides the item identification 218 to the recommendation system 108 in response to the request received from the recommendation system 108. The output module 206 can then provide recommendations of those identified one or more items as recommendations 142.

Additionally or alternatively, the trendsetter behavior identification module 116 can be implemented in the recommendation system 108. In such situations, the user affinity module 204 provides the trendsetter affinity information 214 to the output module 206, which provides the trendsetter affinity information 214 to the recommendation system 108. Accordingly, in such situations the recommendation system 108 identifies one or more items that a trendsetter associated with an identified user has consumed.

Figure 4:
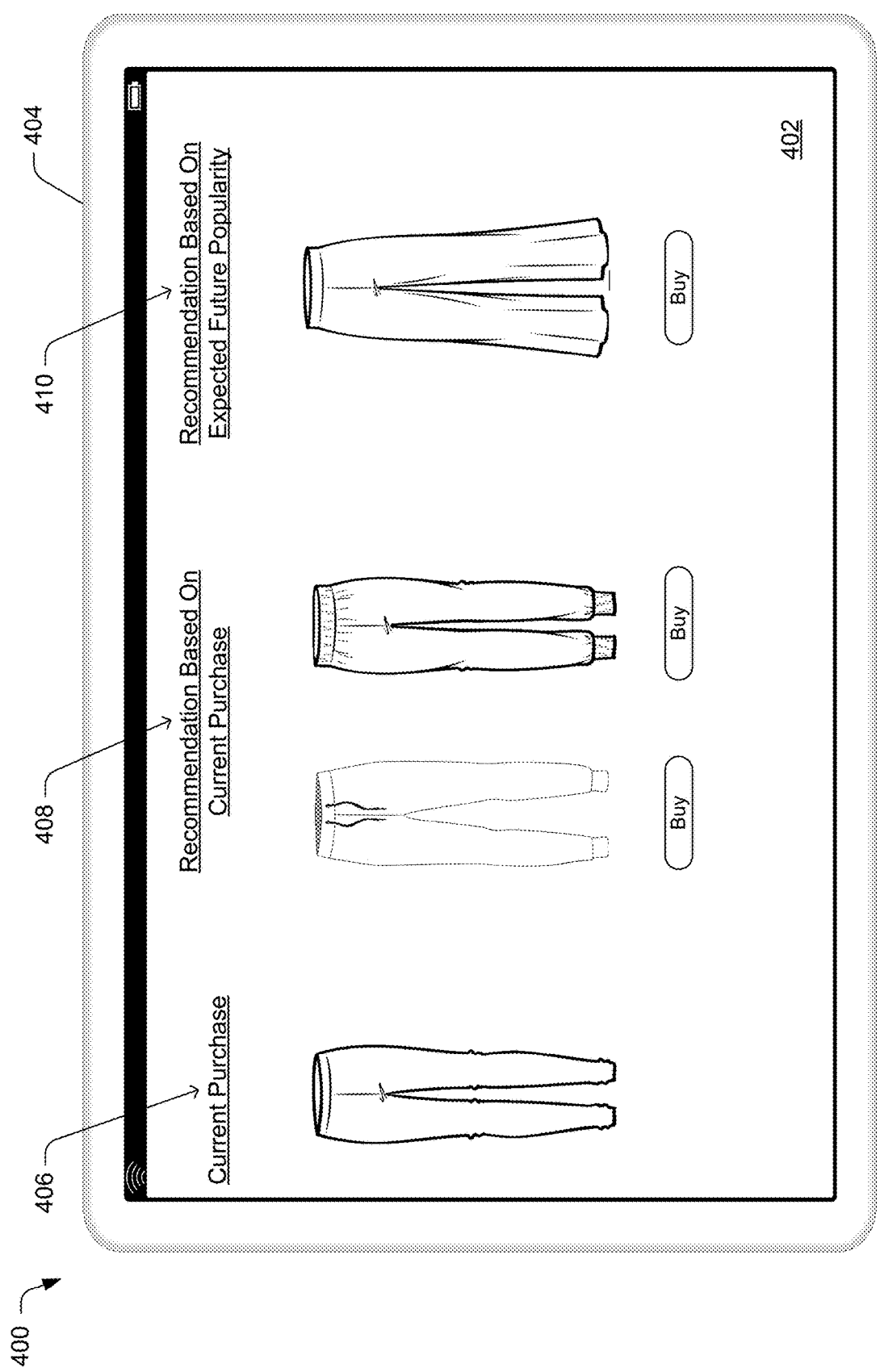
FIG. 4 illustrates an example of using the techniques discussed herein.

FIG. 4 illustrates an example 400 of using the techniques discussed herein. In the example 400, a user interface 402 rendered by a display device 404 is illustrated. The user interface 402 illustrates an example of a current user purchasing pants, illustrated as current purchase 406. Recommendations 408 for additional pants to purchase are also displayed. These recommendations 408 are generated based on the currently purchased pants. The recommendation system 108 can use any of a variety of different public or proprietary techniques to generate these recommendations, such as by identifying other pants available for purchase that are similar to (e.g., have similar styles, colors, materials, etc.) the currently purchased pants. A "buy" button is also displayed, for each of the recommended pants 408, which can be selected by the current user to purchase the corresponding recommended pants 408.

A recommendation 410 for still more pants to purchase is also displayed. This recommendation 410 is generated using the recommender system based on trendsetter inference techniques discussed herein. The recommendation 410 is thus generated based on item consumption (e.g., pants purchased) by a trendsetter with which the current user of the display device 404 has an affinity. This recommendation 410 is a recommendation of pants that the user may be interested in buying (due to their affinity with the trendsetter) and that are predicted or inferred to become popular in the future (due to their having been previously purchased by a trendsetter) even though they are not currently considered popular.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

Figure 5:
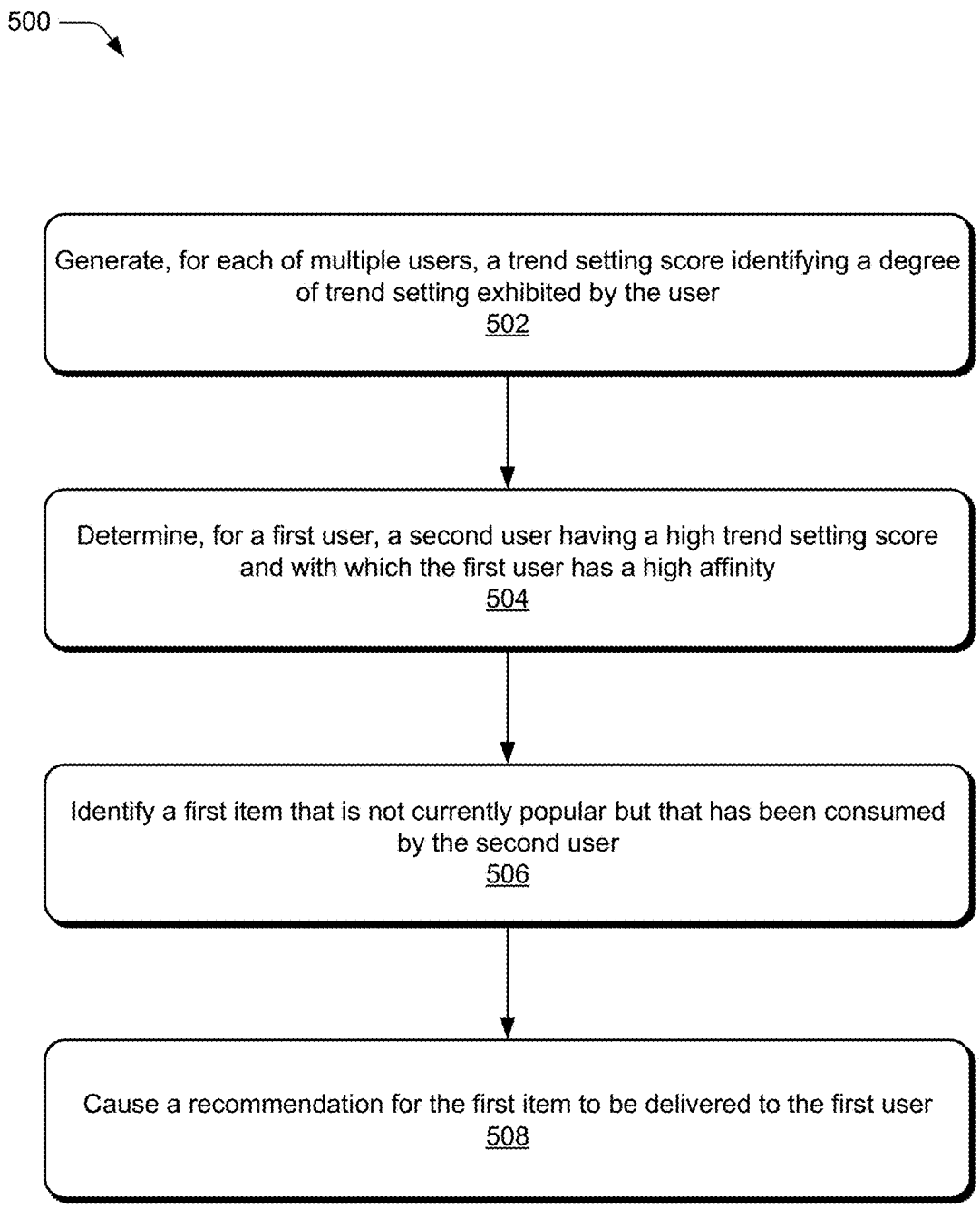
FIG. 5 is a flow diagram depicting a procedure in an example implementation of recommender system based on trendsetter inference.

FIG. 5 is a flow diagram depicting a procedure in an example 500 implementation of recommender system based on trendsetter inference. In this example, for each of multiple users a trend setting score identifying a degree of trend setting exhibited by the user (block 502). This trend setting score for a user indicates how well the user identifies trends by consuming items prior to the items becoming popular.

For a first user of the multiple users, a second user having a high trend setting score and with which the first user has a high affinity is determined (block 504). This affinity is determined based on the similarity in characteristics or behaviors of the users as discussed above.

A first item that is not currently popular but that has been consumed by the second user is identified (block 506). This first item, although not currently popular, is anticipated to become popular because of the trend setting ability of the second user as identified by the high trend setting score of the second user.

A recommendation for the first item is caused to be delivered to the first user (block 508). This recommendation can be caused to be delivered to the first user by, for example, a trendsetter inference system notifying a recommendation system of the first item and a recommendation delivery platform delivering the recommendation for the first item as discussed above.

Example System and Device

Figure 6:
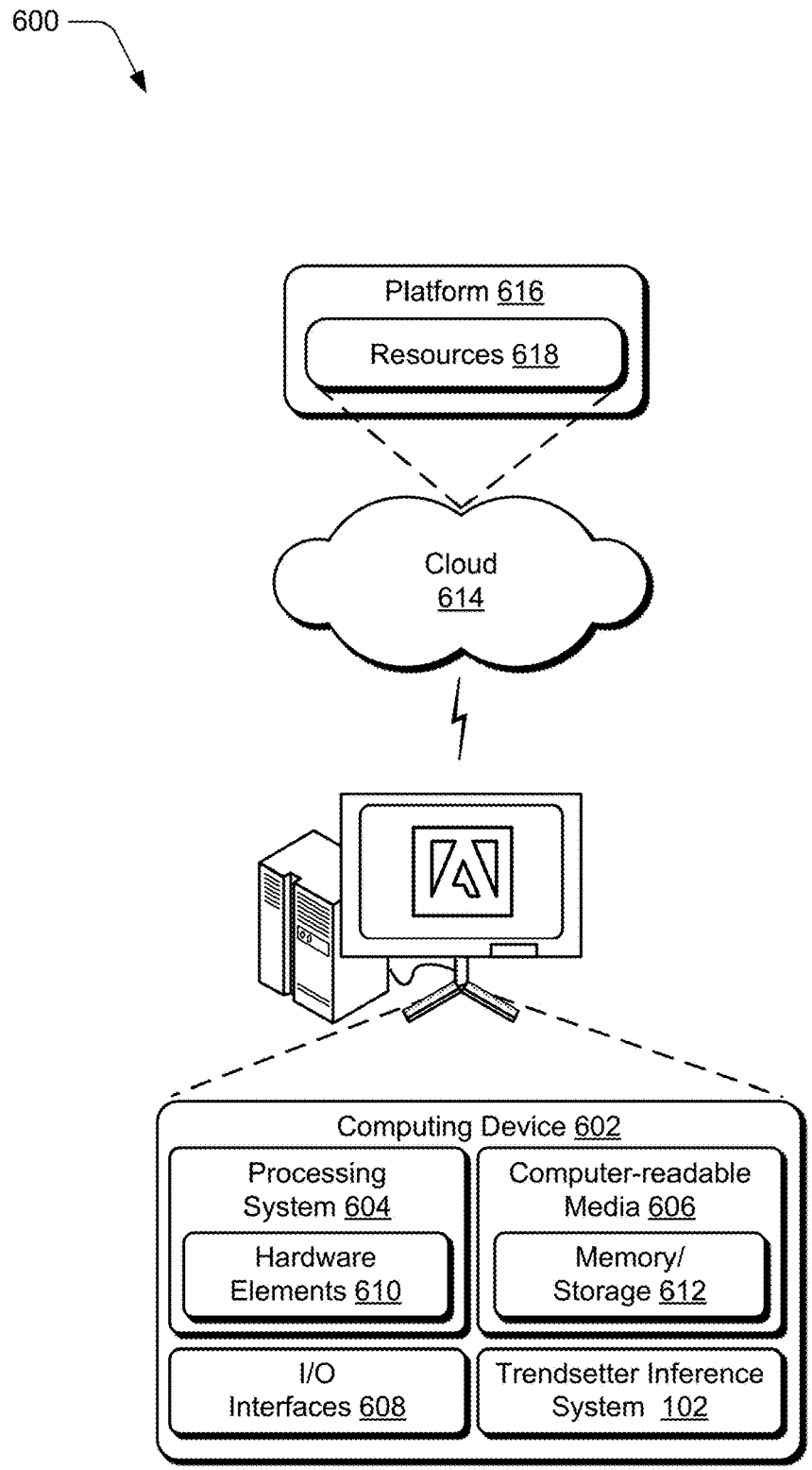
FIG. 6 illustrates an example system including various components of an example device that can be implemented as any type of computing device as described and/or utilize with reference to FIGS. 1-5 to implement aspects of the techniques described herein.

FIG. 6 illustrates an example system generally at 600 that includes an example computing device 602 that is representative of one or more computing systems and/or devices that may implement the various techniques described herein. This is illustrated through inclusion of the trendsetter inference system 102. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware.

Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to cause an item recommendation to be delivered to a client device, a method implemented by at least one computing device, the method comprising:
    generating, by the at least one computing device and for each of multiple users, a trend setting score identifying a degree of trend setting exhibited by the user by generating a weighted combination of two or more of a frequency with which the user consumes items that gain popularity after an amount of time, a number of first additional users of the multiple users that consumed items after the amount of time, a social media score, and trend setting scores of second additional users of the multiple users that exhibit similar trends after the amount of time, wherein items that gain popularity after an amount of time are items that are each consumed at least a threshold number of times during the amount of time or that are consumed in accordance with one or more patterns over the amount of time;
    determining, by the at least one computing device for a first user of the multiple users, a second user of the multiple users having a trend setting score that satisfies a threshold value and having characteristic or behavior representations within a threshold distance of characteristic or behavior representations of the first user;
    identifying, by the at least one computing device, a first item that is not currently popular but has been consumed by the second user; and
    causing, by the at least one computing device, a recommendation for the first item to be communicated over a network for display to the first user.

2. The method as recited in claim 1, the generating the weighted combination for a user comprising:
    determining the frequency with which the user consumes items that subsequently gain popularity after the amount of time; and
    applying a first weight to the frequency.

3. The method as recited in claim 2, the determining the frequency with which the user consumes items that subsequently gain popularity after the amount of time comprises identifying, for the user, a pattern of consuming an item followed by, after the amount of time, an increased consumption of the item by other users.

4. The method as recited in claim 3, the generating the weighted combination further comprising:
    determining the number of first additional users of the multiple users that consumed items after the items became popular; and
    applying a second weight to the number of first additional users.

5. The method as recited in claim 4, the generating the weighted combination further comprising:
    determining the trend setting scores of second additional users of the multiple users that consumed the item after the amount of time; and
    applying a third weight to the trend setting scores of the second additional users.

6. The method as recited in claim 5, the generating the weighted combination further comprising:
    determining activity of the user on social media;
    assigning the social media score to the user based on the activity; and
    applying a fourth weight to the social media score.

7. The method as recited in claim 6, the generating the trend setting score further comprising generating, as the weighted combination, a value by summing:
    the frequency with which the user consumes items that subsequently gain popularity after the amount of time weighted by the first weight;
    the number of first additional users of the multiple users that consumed the items after the items became popular weighted by the second weight;
    the social media score weighted by the third weight; and
    the trend setting scores of second additional users of the multiple users that consumed the item after the amount of time weighted by the fourth weight.

8. The method as recited in claim 1, the generating the trend setting score for a user comprising:
    determining activity of the user on social media;
    assigning a social media score to the user based on the activity; and
    incorporating the social media score into the trend setting score.

9. A system comprising:
    a user scoring module implemented at least partially in hardware of at least one computing device and configured to generate, for each of multiple users, a trend setting score identifying a degree of trend setting exhibited by the user by generating a weighted combination of two or more of a frequency with which the user consumes items that gain popularity after an amount of time, a number of first additional users of the multiple users that consumed items after the amount of time, a social media score, and trend setting scores of second additional users of the multiple users that exhibit similar trends after the amount of time, wherein items that gain popularity after an amount of time are items that are each consumed at least a threshold number of times during the amount of time or that are consumed in accordance with one or more patterns over the amount of time;

a user affinity module implemented at least partially in hardware of the at least one computing device and configured to determine, for a first user of the multiple users, a second user of the multiple users having a trend setting score that satisfies a threshold value and having similar characteristic or behavior representations within a threshold distance of characteristic or behavior representations of the first user; and a trendsetter behavior identification module implemented at least partially in hardware of the at least one computing device and configured to identify a first item that is not popular but has been consumed by the second user and to cause a recommendation for the first item to be communicated to the first user via a network and a recommendation delivery platform.

10. The system as recited in claim 9, the user scoring module generating the weighted combination by:

determining the frequency with which the user consumes items that subsequently gain popularity after the amount of time; and applying a first weight to the frequency.

11. The system as recited in claim 10, the determining the frequency with which the user consumes items that subsequently gain popularity after the amount of time comprises identifying, for the user, a pattern of consuming an item followed by, after the amount of time, an increased consumption of the item by other users.

12. The system as recited in claim 11, the user scoring module further generating the weighted combination by:

determining the number of first additional users of the multiple users that consumed items after the items became popular; and applying a second weight to the number of first additional users.

13. The system as recited in claim 12, the user scoring module further generating the weighted combination by:

determining the trend setting scores of second additional users of the multiple users that consumed the item after the amount of time; and applying a third weight to the trend setting scores of the second additional users.

14. The system as recited in claim 13, the user scoring module further generating the trend setting score by:

determining activity of the user on social media;

assigning a social media score to the user based on the activity; and incorporating the social media score into the trend setting score.

15. A system comprising:

an input module, implemented at least in part in hardware, to receive item consumption data regarding multiple users and social media data regarding the multiple users;

means for determining, for a first user of the multiple users, a second user of the multiple users having a trend setting score that satisfies a threshold value and having characteristic or behavior representations within a threshold distance of characteristic or behavior representations of the first user, the trend setting score of the second user identifying a degree of trend setting exhibited by the second user; and an output module, implemented at least in part in hardware, to output an identification of a first item, to cause a recommendation for the first item to be communicated to the first user via a network and a recommendation delivery platform, the first item being not popular but having been consumed by the second user.

16. The system as recited in claim 15, the means for determining including means for determining a trend setting score of the second user by:

determining a frequency with which the user consumes items that subsequently gain popularity after an amount of time; and incorporating the frequency into the trend setting score.

17. The system as recited in claim 16, the means for determining the trend setting score of the second user including means for determining the trend setting score of the second user by:

determining a number of first additional users of the multiple users that consumed the item after the item became popular; and incorporating the number of first additional users into the trend setting score.

18. The system as recited in claim 17, the means for determining the trend setting score of the second user including means for determining the trend setting score of the second user by:

determining trend setting scores of second additional users of the multiple users that consumed the item after the amount of time; and incorporating the trend setting scores of the second additional users into the trend setting score.

19. The method as recited in claim 1, the determining the second user further comprising:

generating a representation of characteristics or behaviors of the first user;

generating, for each of the multiple users, a representation of characteristics or behaviors of the user;

determining, for each of the multiple users, a distance between the representation of the characteristics or behaviors of the first user and the representation of the characteristics or behaviors of the user; and selecting, as the second user, one of the multiple users having a smallest distance between the representation of the characteristics or behaviors of the first user and the representation of the characteristics or behaviors of the user.

20. The method as recited in claim 1, the characteristics or behaviors of a user including at least one of items consumed by the user, timing of items consumed by the user, items viewed by the user, and timing of items viewed by the user.

* * * * *